Sept. 11, 1923.  
W. P. HAMMOND  
1,467,636  
GLASS COVERED INSTRUMENT BOARD FOR MOTOR VEHICLES  
Filed May 26, 1921
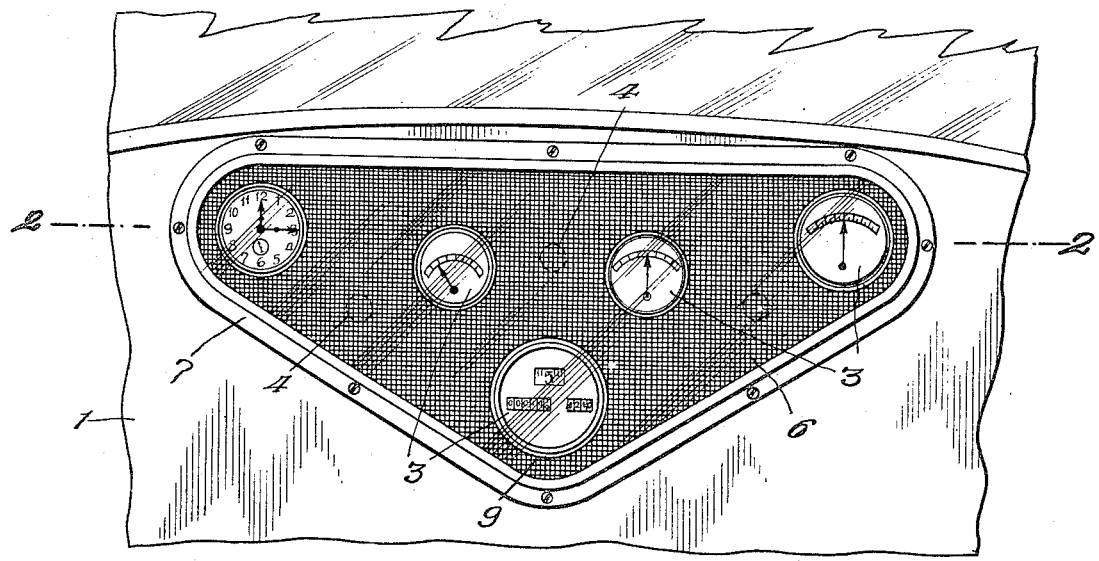
Fig.1.
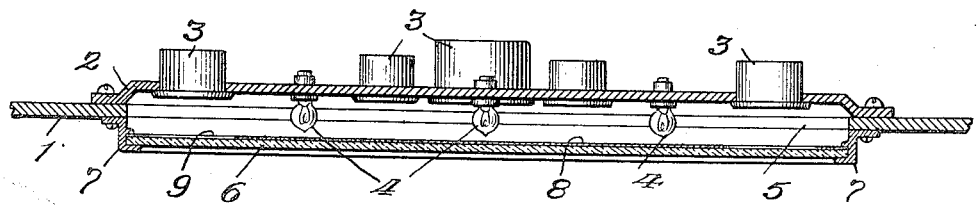
Fig.2.
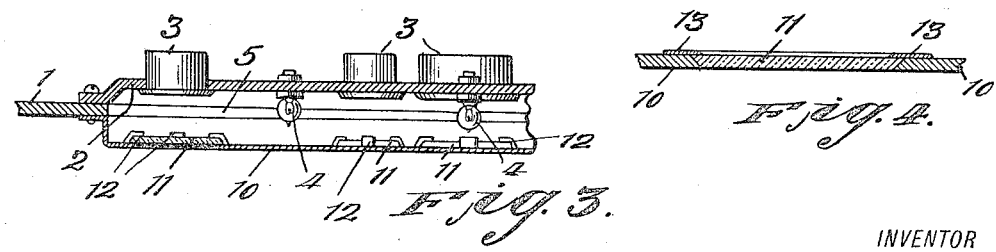
Fig.3.   Fig.4.
INVENTOR  
WILLIAM P. HAMMOND  
BY  
ATTORNEYS Patented Sept. 11, 1923.

1,467,636

UNITED STATES PATENT OFFICE.

WILLIAM P. HAMMOND, OF MAPLEWOOD, NEW JERSEY.

GLASS-COVERED INSTRUMENT BOARD FOR MOTOR VEHICLES.

Application filed May 26, 1921. Serial No. 472,816.

*To all whom it may concern:*

Be it known that I, WILLIAM P. HAMMOND, a citizen of the United States, residing in Maplewood, county of Orange, and State of New Jersey, have invented certain new and useful Improvements in Glass-Covered Instrument Boards for Motor Vehicles, of which the following is a specification.

The present invention relates more particularly to improvements in glass covered instrument boards for use on motor vehicles and is an improvement upon the structure illustrated and described in United States Letters Patent No. 1,296,182, granted to me on March 4th, 1919.

In that patent, I have illustrated an instrument board in which all the measuring and indicating instruments are covered by a single sheet of glass or any other transparent material, in the stead or place of independent crystals or glasses by which the various instruments are ordinarily protected.

My present invention comprehends the provision of illuminating means for the instruments in an instrument assembly of the character referred to. I propose to conceal the electric lamp or lamps and position them in such a way as to be shielded from direct observation while the emitted light will be directed over the faces of the various instruments so as to make them readily readable. In a preferable construction I position the covering sheet of glass spaced from the faces of the instruments thus allowing for the interposition of suitable electric lamps to afford the required illumination. The lamps are preferably positioned between the instruments and in order to conceal them from direct observation and prevent them from shining in the eyes of the driver I render opaque said covering sheet of glass except those portions opposite the faces of the instruments and through which they can be observed. In this manner the light is distributed or diffused over the faces of all of the instruments in a suitable and satisfactory manner.

The invention obviates the use of dash lamps which are commonly employed for illuminating the faces of the instruments, which dash lamps protrude from the face of the instrument board and are apt to be in the way.

With these and other objects in view, I will proceed to describe one preferable embodiment of the principles of my invention, reference being had to the accompanying sheet of drawing, forming a part thereof.

Figure 1 is a front plan view in fragmentary detail of a conventional automobile dash board embodying the principles of my invention.

Figure 2 is a transverse sectional view, taken on line 2—2 of Figure 1.

Figure 3 is a similar view of Figure 2, illustrating a modification.

Figure 4 is a transverse sectional fragmentary detail of a still further modification.

In detail, 1 indicates a dash board of a motor vehicle, upon which is detachably mounted an instrument board 2, having removably mounted and supported thereon, a series of indicating and registering instruments 3 and one or more electric lamps 4. The instrument board 2 is fastened to the dash board 1, through an aperture 5 therein, in such a way that the faces of all of the instruments may be observed through said aperture. At the opposite side of the dash board 1, to which the instrument board 2 is fastened, is a covering plate 6, mounted in a suitable frame 7, removably supported upon the dash board.

This covering plate 6 in the form illustrated in Figures 1 and 2, comprises a glass plate extending across the faces of all of the instruments. The glass plate is rendered opaque, as for instance by frosting, excepting at points immediately opposite the faces of the instruments, at which points the glass remains clear and transparent, so that the instruments can be readily observed therethrough.

This may be accomplished by putting a coating 8 directly upon the glass or by inserting a sheet of opaque material provided with openings 9, corresponding in diameter to the instrument faces and clamping it in position between the glass plate and the frame holding it, or by any other suitable means, whereby the light rays of the lamps 4 will be deflected and diffused over the faces of the instruments, so that the same will be thrown into relief and will be readily observable through the windows. In order to increase the light or illumination within the instrument compartment, the undersurface of the covering plate may be enamelled white or a mirror-like reflecting surface could readily be provided.

Referring to Figure 3, wherein I have illustrated a modification of the idea, the covering plate 10 is made of sheet metal having apertures corresponding in diameter to the faces of the instruments, which apertures are covered by transparent discs or plates 11, these being held in position by retaining lugs or fasteners 12, or I may mount the glass plate 11 in such a way as to be flush with the metal covering plate 10, as shown in Figure 4, in which event suitable ring-like retaining members 13 are soldered to the metal covering plate 10, the latter being provided to hold the transparences 11 in proper position. In this form, the transparencies covering the apertures in the plate are substantially flush with the plate itself.

Obviously, some of the advantages of my invention can be attained by employing an opaque sheet of material provided with openings unprotected by transparencies; that is to say, the indirect lighting or illuminating of the faces of the instruments is not dependent upon covering the openings in the plate. Therefore, where I use the word "window" in the appended claims, I desire to be understood as including such an uncovered or unprotected opening in my invention as defined.

While I have illustrated and described certain preferable embodiments of the principles of the invention, I have done so by way of example only, desiring it to be understood that I do not wish to limit myself to the structural details shown and described, and reserve, therefore, unto myself such changes in construction as come within the scope and tenor of the following claims.

Having thus described my invention, I claim:

1. In combination with an instrument board for motor vehicles, provided with a series of instruments, a single sheet of glass plate extending across the faces of the instruments, said glass plate being rendered opaque throughout its area excepting at portions thereof directly opposite the faces of the instruments, where the glass plate remains transparent.

2. In combination with an instrument board for motor vehicles, provided with a series of instruments, a glass plate covering said instruments, portions of the surface of which is rendered substantially opaque and a concealed source of light for illuminating the faces of the instruments whereby they may be observed through the plate.

In testimony whereof I have affixed my signature to this specification.

WILLIAM P. HAMMOND.